(12) United States Patent
Nelsen

(10) Patent No.: US 6,230,370 B1
(45) Date of Patent: May 15, 2001

(54) BELT SHORTENING DEVICE WITH SIDE ACCESS SLOT

(75) Inventor: Daniel J. Nelsen, Providence, RI (US)

(73) Assignee: Constance F. Berger, Naples, FL (US)

( * ) Notice: Subject to any disclaimer, the term of this patent is extended or adjusted under 35 U.S.C. 154(b) by 0 days.

(21) Appl. No.: 09/371,353

(22) Filed: Aug. 10, 1999

(51) Int. Cl.[7] .............................. A44B 11/00; B25B 25/00
(52) U.S. Cl. ...................... 24/68 CD; 24/68 R; 24/909; 410/110
(58) Field of Search .................. 24/68 CD, 68 R, 24/265 AL, 909; 410/110, 117

(56) References Cited

U.S. PATENT DOCUMENTS

| | | |
|---|---|---|
| 169,770 | 11/1875 | Burnham . |
| 430,581 * | 6/1890 | Kiler ........................................ 24/909 |
| 482,035 | 9/1892 | Buckingham . |
| 493,432 * | 3/1893 | Kidd ........................................ 24/909 |
| 547,760 | 10/1895 | Bickel . |
| 604,302 * | 5/1898 | Clark ........................................ 24/909 |
| 609,405 * | 8/1898 | Bickel ...................................... 24/909 |
| 669,506 * | 3/1901 | Clark ........................................ 24/909 |
| 799,767 | 9/1905 | Weisenborn . |
| 1,579,523 * | 4/1926 | Gouirand et al. ....................... 24/909 |
| 1,606,221 | 11/1926 | Hergesheimer . |
| 1,620,363 | 3/1927 | Larkin . |
| 1,963,436 * | 6/1934 | Dumke .................................... 24/909 |
| 2,526,216 | 10/1950 | Gartner ................................... 24/71.2 |
| 3,574,342 | 4/1971 | Berns ....................................... 254/79 |
| 3,749,366 | 7/1973 | Brucker . |
| 3,826,473 | 7/1974 | Huber ...................................... 254/164 |
| 4,510,652 | 4/1985 | van Iperen ........................ 24/68 CD |
| 4,604,773 | 8/1986 | Weber et al. ........................... 24/71.2 |
| 4,823,443 | 4/1989 | Waters ..................................... 24/68 |
| 4,860,606 | 8/1989 | Rousseau . |
| 4,913,608 | 4/1990 | Royball . |
| 4,922,582 | 5/1990 | Flanigan ................................. 24/71.1 |
| 5,103,536 | 4/1992 | Kamper ............................. 24/68 CD |
| 5,426,827 | 6/1995 | Tracy et al. ......................... 24/68 R |
| 5,839,789 | 11/1998 | Koledin ................................. 297/476 |
| 5,845,372 | 12/1998 | Smith et al. ........................... 24/168 |
| 6,000,890 * | 12/1999 | Macias ................................. 410/110 |
| 6,047,451 * | 4/2000 | Berger et al. ..................... 24/68 CD |

FOREIGN PATENT DOCUMENTS 4240450   3/1994   (DE) .

* cited by examiner

Primary Examiner—Victor N. Sakran
(74) Attorney, Agent, or Firm—Barlow, Josephs & Holmes, Ltd.

(57) ABSTRACT

A belt shortening device with a side access slot for receiving a belt is provided. The device includes a frame and a spindle rotatably mounted thereto. The spindle includes a mount end in communication with the frame and a free end opposite to the mount end. The spindle has a slot extending from the free end toward the mount end a length defining a first finger and a second finger. Optionally, a first and second plates are, respectively affixed to the first and second fingers proximal to the free ends thereof. The plates are positioned substantially perpendicular to the longitudinal axis of the spindle and, respectively emanate away from the slot. The plates are positioned from said mount end a distance greater than the width of a belt to be shortened. The plates prevent accidental lateral ejection of the belt out of the slot. A ratchet mechanism is provided to control the rotation of the spindle and winding of a belt therearound. The belt shortening device is easily retrofitted to an existing belt without detaching the belt from its existing connection.

9 Claims, 5 Drawing Sheets

BELT SHORTENING DEVICE WITH SIDE ACCESS SLOT

BACKGROUND OF THE INVENTION

The present invention relates generally to belt shortening devices. More specifically, the present invention relates to devices suitable for shortening seat belt webbing. In addition, the present invention relates to the removal of slack from seat belt webbing retaining a baby seat in place on a supporting vehicle seat.

In the prior art, lengths of belt material or webbing are commonly used to retain a structure in place. For example, belts are frequently used to retain stacked articles in place on a pallet. Belts are also commonly employed in vehicles to secure an occupant for safety purposes. In particular, these existing belts in vehicles are typically used to secure a baby's seat to the supporting vehicle seat. While belts are effective for security, they suffer from the disadvantage of having unwanted slack which decreases the effectiveness of the belts ability to secure and retain.

To address the inherent problem of slack in belts for retaining, there have been many attempts in the prior art to reduce or eliminate such slack. For example, ratcheted spindles have been available in the prior art. The belt webbing is typically routed around the spindle and wound about the spindle with the assistance of the ratchet. Further, the ratchet provides additional leverage and locking to enable the belt to be tightened and released as desired. Also, spring clips have been provided to grip excess portions of the belt to thereby shorten the belt.

However, these prior art devices suffer from many disadvantages which makes them undesirable to use. These prior art devices commonly require that a free end of the belt be routed through the device to enable winding of the belt by the device to effectuate shortening. Other devices permanently incorporate the ratchet take-up mechanism directly on the belt itself. Such devices are commonly used on special belt systems for retaining articles on a pallet. As can be understood, the foregoing prior art devices are unsuitable for shortening vehicle seat belts because vehicle seat belts are not capable of being routed onto a ratchet take-up mechanism due to the presence of bulky buckles, both male and female, present on the free ends of the belts.

In view of the foregoing, there is a demand for a belt shortening device which is well suited for shortening vehicle seat belts. There is a particular demand for a belt shortening device that can be easily retrofitted to an installed baby seat without disengaging the existing belt connection. In addition, there is a demand for a belt shortening device that is compact, inexpensive and easy to operate.

SUMMARY OF THE INVENTION

The present invention preserves the advantages of prior art belt shortening devices. In addition, it provides new advantages not found in currently available devices and overcomes many disadvantages of such currently available devices.

The invention is generally directed to a novel and unique belt shortening device that can be easily mounted to an existing belt with detaching the belt from its existing connection. The belt shortening device of the present invention includes a side access slot for receiving a belt to be wound. The device includes a frame and a spindle rotatably mounted thereto. The spindle includes a mount end in communication with the frame and a free end opposite to the mount end. The spindle has a slot extending from the free end toward the mount end a length defining a first finger and a second finger. Optionally, a first and second plates are, respectively affixed to the first and second fingers proximal to the free ends thereof. The plates are positioned substantially perpendicular to the longitudinal axis of the spindle and, respectively emanate away from the slot. The plates are positioned from said mount end a distance greater than the width of a belt to be shortened. The plates prevent accidental lateral ejection of the belt out of the slot. A ratchet mechanism is provided to control the rotation of the spindle and winding of a belt therearound. The belt shortening device is easily retrofitted to an existing belt without detaching the belt from its existing connection.

For installation and operation, the belt shortening device of the present invention is slid laterally over a existing length of belt webbing which is, perhaps, securing a baby seat to a vehicle seat. The belt webbing is inserted into the slot of the device with the entire width of the belt residing completely within the housing of the device. The belt is threaded between the two fingers of the rotating spindle. A window through the housing of the device assists in the initial installation of the webbing. The handle of the ratchet mechanism is repeatedly pulled by the user to rotate the spindle and, thus, rotate the fingers which bound the belt on its opposing sides. Safety plates are positioned on the free ends of the fingers to prevent the belt from sliding out of the slot during installation. Rotation of the fingers causes the belt to be wound about the spindle reducing the overall length of the belt. The window through the housing further assists in determining how much belt material has been wound by the device.

When the desired tension is achieved, pulling of the handle is stopped thus ceasing any further winding of the belt webbing. The ratchet mechanism is provided with a suitable locking device to prevent unwinding of the belt from the spindle. In addition, a lock release is provided to permit the belt to be unwound from the spindle, such as for when removal of the device from the belt is desired. Once the belt is completely unwound, the device can be easily slid off in a lateral direction.

It is therefore an object of the present invention to provide a device that can shorten a belt such as a seat belt.

It is an object of the present invention to provide a belt shortening device suitable for shortening a seat belt retaining a baby seat in place on a vehicle seat.

It is a further object of the present invention to provide a belt shortening device that can be easily retrofitted to an existing belt web without detaching the belt from its existing connection.

Another object of the present invention is to provide a belt shortening device that requires no additional belt webbing or additional buckles.

It is a further object of the present invention to provide a belt shortening device that is inexpensive to manufacture.

Another object of present invention is to provide a belt shortening device that is easy to install and operate.

Another object of the present invention is to provide a belt shortening device that is compact and portable.

A further object of the present invention is to provide a belt shortening device that can remove undesirable and unsafe slack present in a seat belt securing a baby seat to a vehicle seat.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
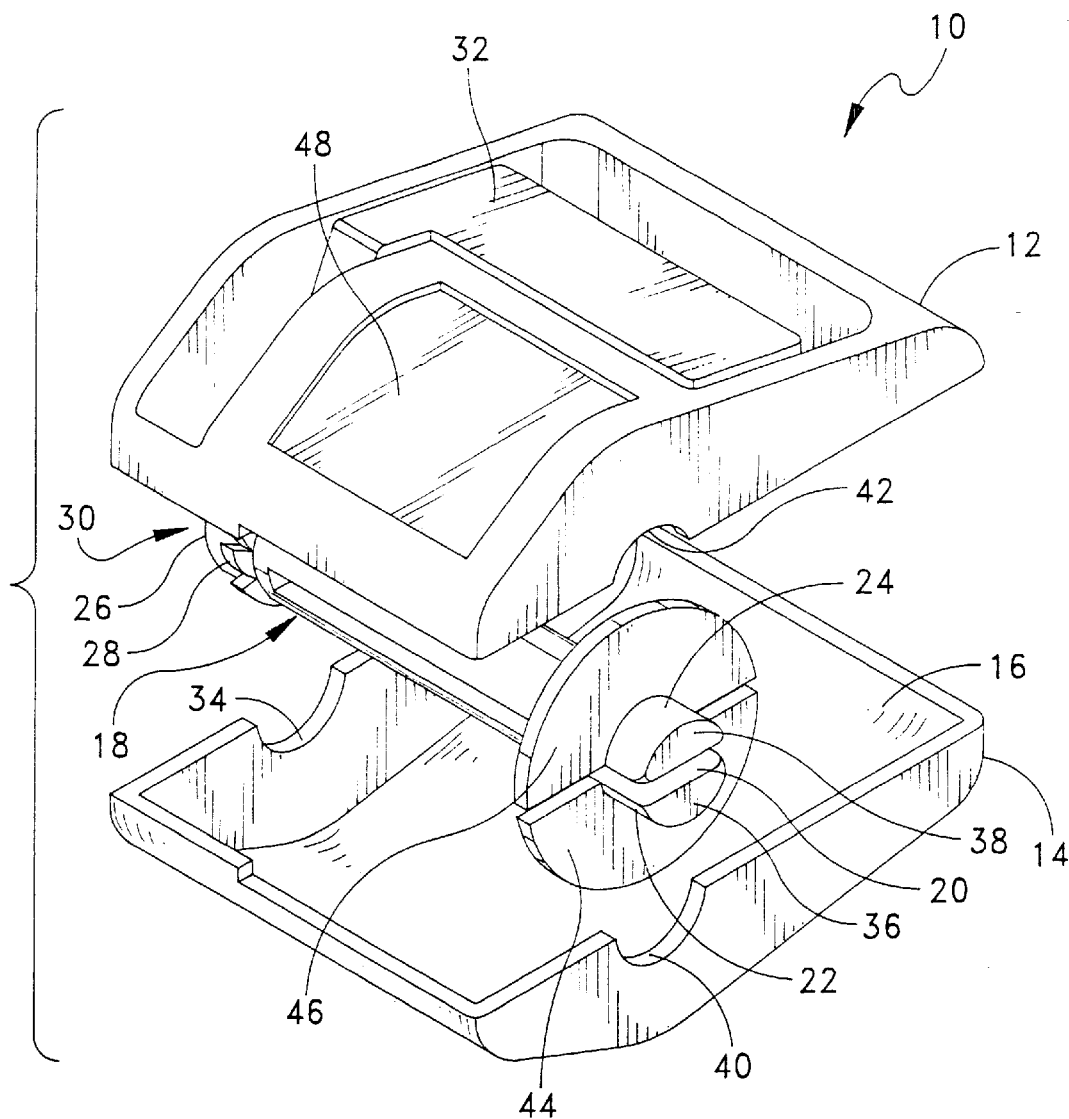
FIG. 1 is an exploded perspective view of the preferred embodiment of the belt shortening device of the present invention.

Turning first to FIG. 1, an exploded perspective view of the belt shortening device 10 of the present invention. An upper housing 12 and lower housing 14 are provided to define the general configuration of the belt shortening device 10 of the present invention. The upper housing 12 and lower housing 14 are matable together to define a substantially hollow inner cavity 16 to contain a spindle assembly 18 and the subsequent winding of belt material thereon. In particular, the spindle assembly 18 includes a longitudinal slot 20 thus defining two fingers 22 and 24 which emanate laterally from a base 26. A series of teeth 28 a positioned circumferentially about the base 26 to engage with a ratchet mechanism, generally shown as 30, operated by a handle 32, to control the rotation of the spindle 18. In the preferred embodiment of the present invention, the base 26 of the spindle 18 rests on a first seat 34 provided in the lower housing 14 and is bounded at its upper end by a complementary seat (not shown) on the upper housing 12. The free ends 36 and 38 of the two fingers 22 and 24 of the spindle 18 rest on a second seat 40 on the lower housing 14 and are bounded at their upper end by a complementary seat 42 in the upper housing 12. When the upper housing 12 and lower housing 14 are mated together and assembled, the respective seats 34, 40 and 42 provide a containment and support for the base 26 at one end and the free ends 36 and 38 of the spindle 18 at the other end. As a result, the spindle 18 freely rotates within the housing 12 and 14 about its longitudinal axis.

Also shown in FIG. 1, the preferred embodiment of the belt shortening device 10 includes a pair of plates 44 and 46 which are attached proximal to the free ends 36 and 38 of the fingers 22 and 24 of the spindle 18 to provide additional safety for the belt shortening device 10 of the present invention. Operation of the plates 44 and 46 will be discussed in detail below in connection with FIG. 5 below. In addition, a window 48 is provided in the upper housing 12 to assist the user in determining the amount of winding of the belt by the device 10 of the present invention.

Figure 2:
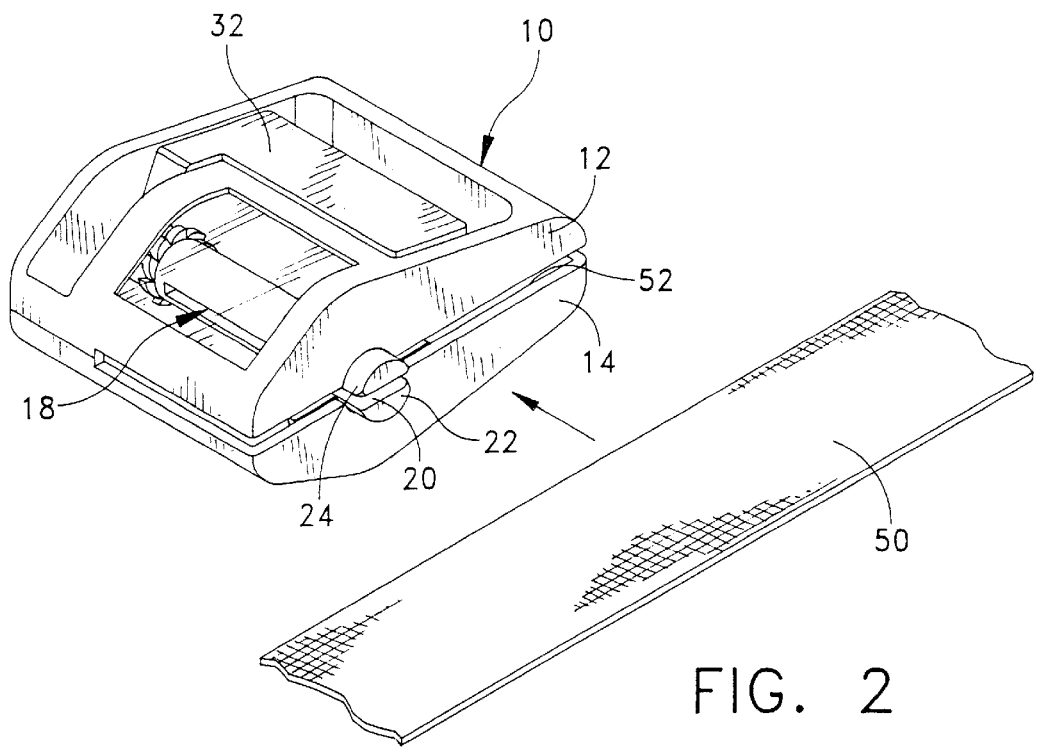
FIG. 2 is a perspective view of the belt shortening device of FIG. 1 receiving a belt to be shortened.
Figure 3:
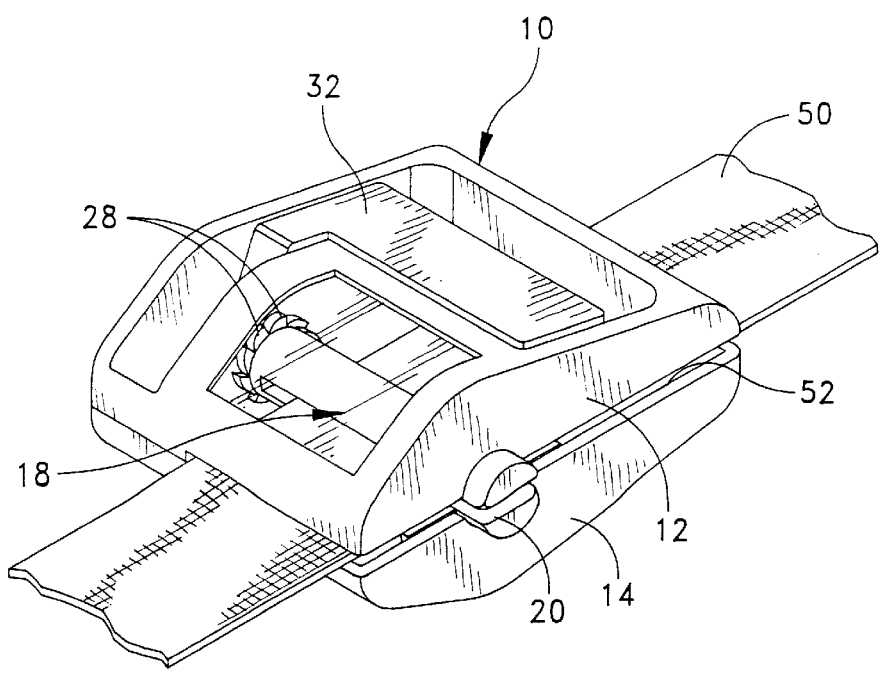
FIG. 3 is a perspective view of the belt shortening device of FIG. 1 after receiving a belt to be shortened and prior to shortening of the belt.
Figure 4:
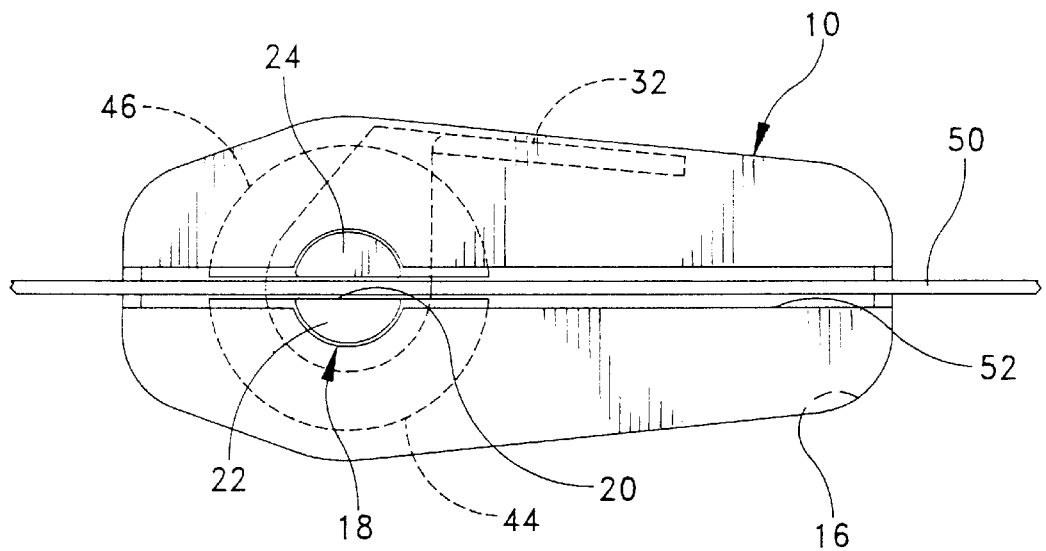
FIG. 4 is a side elevational view of the belt shortening device of the present invention and belt as shown in FIG. 3.

FIGS. 2–6 illustrate the installation and operation of the belt shortening device 10 of the present invention. In FIG. 2, the belt shortening device 10 is shown laterally receiving a belt 50 to be shortened as indicated by the arrow. In FIG. 3, the belt 50 is shown fully inserted into the belt shortening device 10 where the belt 50 is received in a slot 52 defined by upper housing 12 and lower housing 14. Concurrently, the belt 50 is positioned between in the fingers 22 and 24 of the spindle 18 in the corresponding spindle slot 20. This initial positioning of the belt 50 is shown in FIG. 4, a side elevational view of the device 10 and belt 50 shown in FIG. 3.

The width of the device 10 of the present invention is dimension to be greater than the width of the belt 50 to be shortened. In particular, as best seen in FIG. 1, the distance from the base 26 of the spindle slot 20 to the inner side of the plates 44 and 46 is greater than the width of the belt 50 to be shorten to provide adequate clearance for the belt 50 and so it may be properly wound around the spindle 18 without interference.

Figure 5:
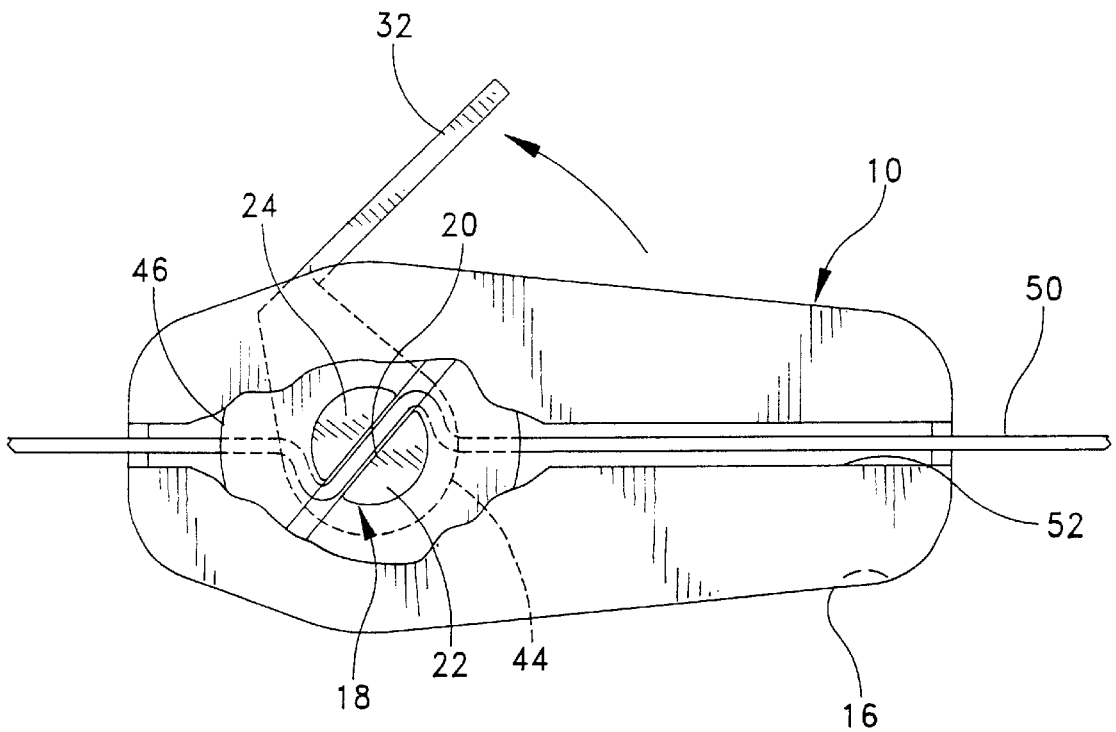
FIG. 5 is a side elevational view of the belt shortening device of the present invention illustrating initial rotation of the spindle.
Figure 6:
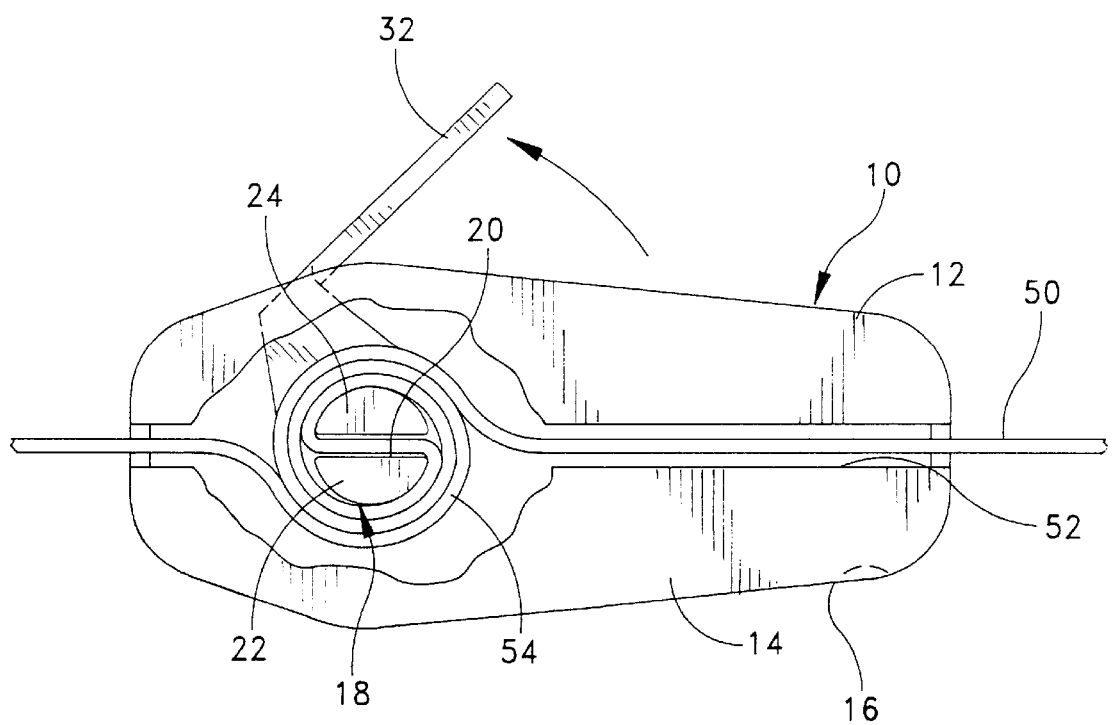
FIG. 6 is a side elevational view of the belt shortening device of the present invention illustrating winding of the belt to be shortened.

Turning now to FIGS. 5 and 6, the shortening of the belt 50 and winding thereof on the spindle 18 is shown. FIG. 5 illustrates the first initial rotation of the spindle 18 via the handle 32. As well known in ratchet mechanisms (not shown in the Figures), a handle 32 is provided to rotate the spindle 18 in a winding or takeup direction represented by the arrow in FIG. 5. When a full crank of the handle 32 is completed, the handle 32 is returned to its resting position similar to that shown in FIG. 1 in preparation for additional cranking. As is known in ratchet mechanisms, the handle 32 is spring-biased so as to return to its resting position. Further, engagement with the teeth 28, as shown in FIG. 1, by a pawl arrangement (not shown) connected to the handle 32 effectuates rotation of the spindle 18 as desired. Further, locking of the spindle 18 is provided by a lock mechanism (not shown) to prevent unwinding of the spindle 18. Also, a release mechanism (not shown) may be provided to release engagement of the handle 32 from the teeth 28 of the spindle 18. Further details of the ratchet mechanism need not be addressed here as ratchet mechanisms are well known in the prior art. In that connection, any type of ratchet or other mechanism may be employed in the present invention as long as the rotation of the spindle 18 about it longitudinal axis is controllable in both directions and can be locked and unlocked as desired.

Still referring to FIG. 5, the plates 44 and 46 are shown to prevent the belt 50, in the process of being wound, from being ejected from the slot 20 in the spindle 18 and the slot 52 in the housing 12 and 14. As can be understood, the positioning of the belt 50 relative to the slot 52 in the housing 12 and 14, as shown in FIG. 4, enables the belt 50 to easily slide in and out. The partial rotation of the spindle 18, as shown in FIG. 5, causes the plates 44 and 46 to also move thus blocking the slot 52 in the housing 12 and 14 and preventing the belt 50 from sliding out therefrom. In FIG. 5, the plates 44 and 46 and the slot 20 in the spindle 18 are now rotationally offset from the slot 52 in the housing 12 and 14. As a result, the plates 44 and 46 are positioning directly in the path of the slot 52 of the housing 12 and 14 thus preventing the belt 50 from now sliding out via the slot 52 in the housing 12 and 14. To release the belt 50, an appropriate release button or lever (not shown) is depressed allowing for the spindle 18 to rotate freely to allow for the belt 50 to be unwound. To remove the belt shortening device 10, the belt 50 is completely unwound and the slot 20 of the spindle 18 is aligned with the slot 52 of the housing 12 and 14 and the belt shortening device 10 is slid off.

Once the handle 32 of the device 10 is cranked several more times, as shown in FIG. 6, the belt 50 is wound about the spindle 18 and about itself and fills the internal cavity 16 defined by the upper housing 12 and lower housing 14. Once a length of belt 50 is wound about the spindle 18, sliding out of the entire wound belt bundle 54 is not possible because the diameter of the wound bundle 54 is greater than the width of the slot 52 in the housing 12 and 14. Further, winding of the belt 50 about the spindle 18 is relatively tight thus, due to friction, making it difficult if not impossible for the wound bundle 54 of belt 50 to slid laterally out from the housing 12 and 14.

Figure 7:
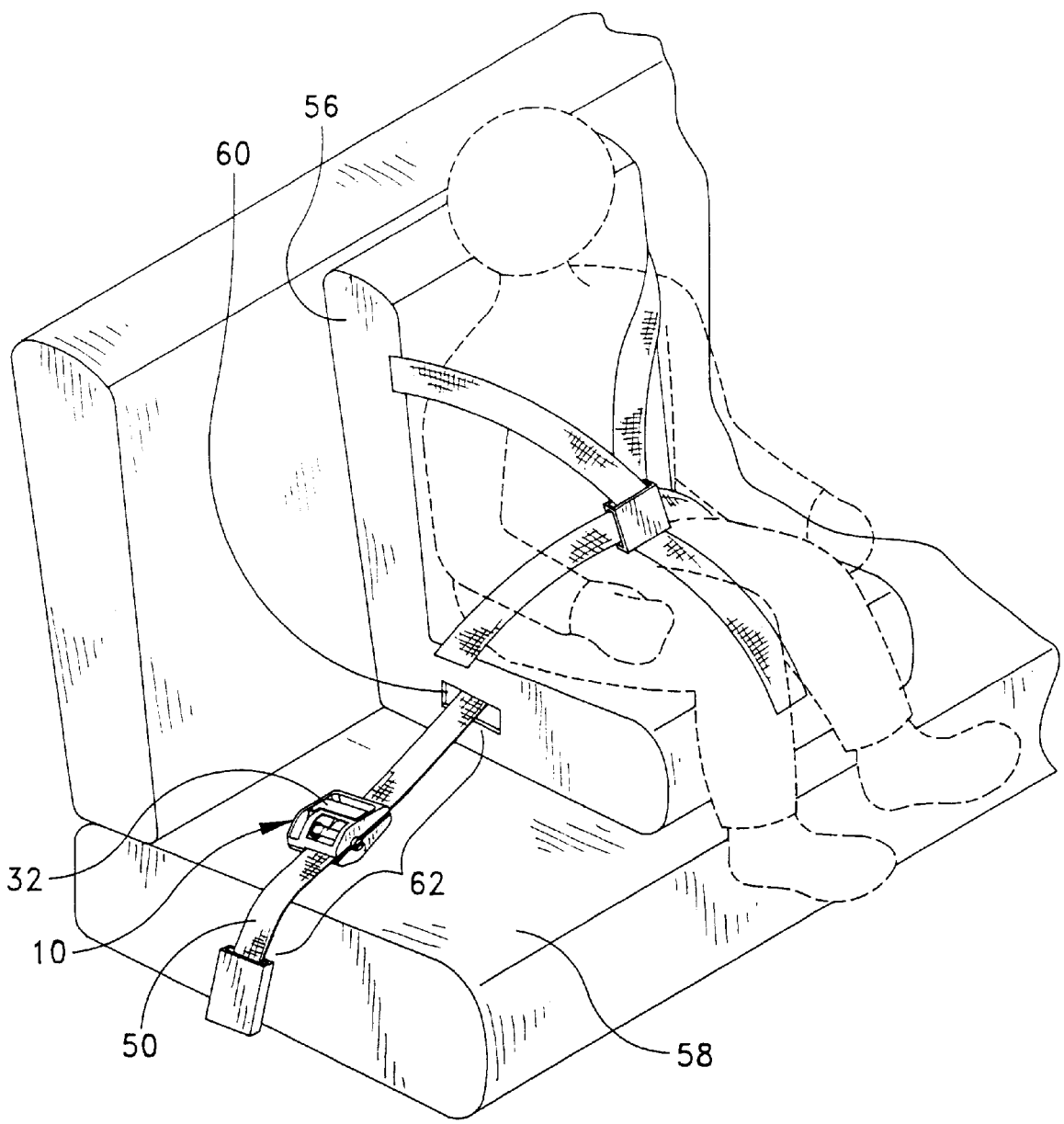
FIG. 7 is a perspective view of an application of the belt shortening device of the present invention for removing the slack in a seat belt securing a baby seat to a vehicle seat.

Referring now to FIG. 7, a perspective view of a use for the belt shortening device 10 of the present invention is shown. As discussed above, the problem of slack in a seat belt 50 that retains a baby seat 56 in place persists. Typically, a baby seat 56 is retained in place on a vehicle seat 58 by routing the preexisting seat belt 50 through an aperture 60 in the baby seat 56. However, slack in the belt 50 remains because due to the inability of the seat belt 50 to fully retract. Even if the belt 50 is fully retracted, the spring-loading of the belt 50 has considerable play in it making it very difficult, if not impossible, to maintain the baby seat 56 in tight and secure communication with the vehicle seat 58 on which it rests. In accordance with the present invention, the belt shortening device 10 is slid on the belt 50 in a free region 62 of the belt 50, such as the region 62 shown in FIG. 7. When the belt shortening device 10 is positioned as desired, the handle 32 is cranked as described above to effective shorten the belt 50 thus tightening and securing the baby seat 56 to the vehicle seat 58.

The belt shortening device 10 of the present invention has particular application is shortening a seat belt 50 in a vehicle as described and shown in connection with FIG. 7. In addition, the belt shortening device 10 may be used to shorten any belt or webbing, such as that found to retain articles on a pallet, or the like. Further, the safety plates 44 and 46 in FIG. 1. above, while preferred, may be omitted if desired and depending on the application at hand. The upper housing 12 and lower housing 14 are preferably made of plastic for ease of manufacture and durability. The spindle 18 is preferably manufactured of metal for strength. The ratchet assembly, including the handle, is preferably made of metal and other suitable materials for such assemblies.

It would be appreciated by those skilled in the art that various changes and modifications can be made to the illustrated embodiments without departing from the spirit of the present invention. All such modifications and changes are intended to be covered by the appended claims.

What is claimed is:

1. A device for shortening a belt having a width, comprising:
    a housing having a width with opposing sides and a length; said housing including a housing slot running along said length and through one of said opposing sides of said housing;
    a spindle, having a longitudinal axis, rotatably mounted to said frame; said spindle including a mount end in communication with said frame and a free end opposite said mount end; said spindle having a spindle slot extending from said free end toward said mount end a length defining a first finger and a second finger each having respective free ends; said housing slot and said spindle slot being capable of coplanar alignment with one another and defining a belt receiving opening;
    a first plate affixed to said first finger proximal to the free end of said first finger; said first plate being positioned substantially perpendicular to said longitudinal axis of said spindle and emanating away from said slot; said first plate being positioned from said mount end a distance greater than a width of a belt to be shortened;
    a second plate affixed to said second finger proximal to the end of said second finger; said second plate being positioned substantially perpendicular to said longitudinal axis of said spindle and emanating away from said slot; said second plate being positioned from said mount end a distance greater than a width of the belt to be shortened; and
    operating means connected to said spindle for controllably rotating said spindle about said longitudinal axis and winding a belt received in said slot about said spindle.

2. The belt shortening device of claim 1, wherein said operating means is a ratchet mechanism.

3. The belt shortening device of claim 2, wherein said ratchet mechanism includes teeth positioned about said mount end providing rotational control, including locking and releasing, of said spindle.

4. A device for shortening a belt having a width, comprising:
    a housing having a first seat, a second seat, a width with opposing sides and a length; said housing including a housing slot running along said length and through one of said opposing side of said housing;
    a spindle, having a longitudinal axis, including a first end and a second end; said first end being rotationally received on said first seat and said second end being rotationally received on said second seat; said spindle having a spindle slot extending from said second end toward said first end a length defining a first finger and a second finger; said first finger and said second finger being rotatable in unison about said longitudinal axis of said spindle; said housing slot and said spindle slot being capable of coplanar alignment with one another and defining a belt receiving opening; and
    operating means connected to said spindle for controllably rotating said spindle about said longitudinal axis and winding a belt received in said slot about said spindle.

5. The belt shortening device of claim 4, further comprising:
    a first plate affixed to said first finger proximal to the free end of said first finger; said first plate being positioned substantially perpendicular to said longitudinal axis of said spindle and emanating away from said slot; said first plate being positioned from said first end a distance greater than a width of a belt to be shortened; and
    a second plate affixed to said second finger proximal to the end of said second finger; said second plate being positioned substantially perpendicular to said longitudinal axis of said spindle and emanating away from said spindle slot; said second plate being positioned from said first end a distance greater than a width of the belt to be shortened.

6. The belt shortening device of claim 4, wherein said operating means is a ratchet mechanism.

7. The belt shortening device of claim 6, wherein said ratchet mechanism includes teeth positioned about said first end providing rotational control and locking of said spindle.

8. The belt shortening device of claim 4, wherein said first plate and said second plate are enclosed within said housing.

9. The belt shortening device of claim 4, further comprising a window in said housing proximal to said spindle.

* * * * *